(12) United States Patent
Yoshida et al.

(10) Patent No.: US 9,350,047 B2
(45) Date of Patent: *May 24, 2016

(54) CERAMIC MATERIAL AND PROCESS FOR PRODUCING THE SAME

(71) Applicant: NGK Insulators, Ltd., Nagoya (JP)

(72) Inventors: Toshihiro Yoshida, Nagoya (JP); Akihiko Honda, Nagoya (JP); Yosuke Sato, Hashima-Gun (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/482,389

(22) Filed: Sep. 10, 2014

(65) Prior Publication Data

US 2014/0377665 A1 Dec. 25, 2014

Related U.S. Application Data

(63) Continuation of application No. 12/543,676, filed on Aug. 19, 2009, now Pat. No. 8,883,357.

(30) Foreign Application Priority Data

| Aug. 21, 2008 | (JP) | 2008-212983 |
| Mar. 24, 2009 | (JP) | 2009-071782 |
| Aug. 7, 2009 | (JP) | 2009-185064 |
| Aug. 17, 2009 | (JP) | 2009-188536 |

(51) Int. Cl.

| *H01M 10/056* | (2010.01) |
| *H01M 10/0562* | (2010.01) |
| *B01J 23/10* | (2006.01) |
| *B01J 23/83* | (2006.01) |
| *C04B 35/495* | (2006.01) |
| *H01M 10/052* | (2010.01) |

(Continued)

(52) U.S. Cl.
CPC .......... *H01M 10/0562* (2013.01); *C04B 35/00* (2013.01); *C04B 35/50* (2013.01); *H01M 10/052* (2013.01); *H01M 2300/0071* (2013.01); *Y02E 60/122* (2013.01)

(58) Field of Classification Search
None
See application file for complete search history.

(56) References Cited

U.S. PATENT DOCUMENTS

| 2007/0148553 A1* | 6/2007 | Weppner .................. 429/322 |
| 2009/0068563 A1 | 3/2009 | Kanda et al. |

(Continued)

FOREIGN PATENT DOCUMENTS

| EP | 2 037 527 A1 | 3/2009 |
| EP | 2 099 086 A1 | 9/2009 |

(Continued)

OTHER PUBLICATIONS

Thangadurai, Novel Fast Lithium Ion Conduction in Garnet-Type Li5La3M2O12 (M = Nb, Ta), 437-440 J. Am. Cer. Soc. 86.3 (2003).*

(Continued)

*Primary Examiner* — Yoshitoshi Takeuchi
(74) *Attorney, Agent, or Firm* — Burr & Brown, PLLC

(57) ABSTRACT

A ceramic material that can exhibit sufficient compactness and lithium (Li) conductivity to enable the use thereof as a solid electrolyte material for a lithium secondary battery and the like is provided. The ceramic material contains aluminum (Al) and has a garnet-type crystal structure or a garnet-like crystal structure containing lithium (Li), lanthanum (La), zirconium (Zr) and oxygen (O).

9 Claims, 8 Drawing Sheets
(7 of 8 Drawing Sheet(s) Filed in Color)

(51) Int. Cl.
  *C04B 35/00*   (2006.01)
  *C04B 35/50*   (2006.01)

(56) References Cited

U.S. PATENT DOCUMENTS

| | | |
|---|---|---|
| 2009/0226790 A1 | 9/2009 | Kanamura et al. |
| 2009/0317664 A1 | 12/2009 | Niessen et al. |
| 2010/0203383 A1* | 8/2010 | Weppner .................. 429/209 |
| 2011/0133136 A1 | 6/2011 | Weppner et al. |
| 2011/0244337 A1 | 10/2011 | Ohta et al. |

FOREIGN PATENT DOCUMENTS

| | | |
|---|---|---|
| JP | 2006-260887 A1 | 9/2006 |
| JP | 2007-528108 A1 | 10/2007 |
| JP | 2009-104818 A1 | 5/2009 |
| JP | 2009-218124 A1 | 9/2009 |
| JP | 2009-238739 A1 | 10/2009 |
| JP | 2009-245913 A1 | 10/2009 |
| JP | 2010-501977 A1 | 1/2010 |
| JP | 2010-045019 A1 | 2/2010 |
| JP | 2010-202499 A1 | 9/2010 |
| JP | 2010-534383 A1 | 11/2010 |
| WO | WO 2009/003695 * | 1/2009 |

OTHER PUBLICATIONS

Murugan et al., *Fast Lithium Ion Conduction in Garnet-Type $Li_7La_3Zr_2O_{12}$*, Angew. Chem. Int. Ed. 2007, 46, pp. 7778-7781.

Thangadurai, *Novel Fasat Lithium Ion Conduction in Garnet-Type $Li_5La_3M_2O_{12}$(M=Nb, Ta)*, J. Am. Cer. Soc, vol. 86, No. 3 (2003), pp. 437-440.

European Office Action (Application No. 09252029.5) dated Dec. 14, 2009.

Japanese Office Action dated Jun. 26, 2012 (with English translation).

European Office Action (Application No. 09252029.5) dated Jul. 29, 2014.

* cited by examiner

CERAMIC MATERIAL AND PROCESS FOR PRODUCING THE SAME

CROSS REFERENCE TO RELATED APPLICATIONS

This application is a continuation of U.S. application Ser. No. 12/543,676, filed Aug. 19, 2009, and claims the benefit under 35 USC §119(a)-(d) of Japanese Patent Application No. 2008-212983 filed Aug. 21, 2008, Japanese Patent Application No. 2009-071782 filed Mar. 24, 2009, Japanese Patent Application No. 2009-185064 filed Aug. 7, 2009, and Japanese Patent Application No. 2009-188536 filed Aug. 17, 2009, the entireties of which are incorporated herein by reference.

FIELD OF THE INVENTION

The present invention relates to a ceramic material and a process for producing the same, and more particularly to a ceramic material for use as a solid electrolyte applicable to an all-solid-state lithium secondary battery, and a process for producing the same.

BACKGROUND OF THE INVENTION

Along with the development of personal computers, cell phones, and other portable devices in recent years, the demand for secondary batteries as a power source therefor has increased dramatically. Electrolytes comprising an organic solvent or other liquid state (liquid electrolytes) have been widely used as a medium for ion transfer in secondary batteries utilized in such applications. However, problems such as leakage of the liquid electrolyte, fire, and explosion can occur in batteries using such a liquid electrolyte.

From the standpoint of ensuring the intrinsic safety of the secondary battery, the use of a solid electrolyte in place of the liquid electrolyte has progressed, as well as the development of an all-solid-state secondary battery in which all other battery components are also solid. Because the electrolyte is a sintered ceramic, this kind of all-solid-state secondary battery is advantageous since there is no fear of fire or leakage, and problems such as deterioration of battery performance due to corrosion are unlikely to occur. Among these, an all-solid-state lithium secondary battery utilizing lithium metal in the electrodes is believed to be a secondary battery that can easily provide a high energy density.

To improve battery properties in the secondary battery, the point therefor becomes widening the difference in potential between the materials used in the cathode and anode, and increasing the specific capacity of the materials used in the poles. With respect to the anode material in particular, it has been found that using lithium metal and lithium alloys imparts a large improvement in the properties thereof. However, because a lithium metal precipitation phenomenon known as dendrite crystallization occurs in association with a lithium intercalation reaction, the dendritic lithium metal can penetrate the separator in a battery utilizing a liquid electrolyte in the electrolyte member and cause a short inside the battery; thus lithium metal could not be used due to safety problems. It is presumed that the all-solid-state battery in which the electrolytic member is formed from a solid can be used safely because the precipitate cannot penetrate the solid electrolyte. However, lithium metal not only has the poorest electrical potential, but it is also highly reactive, so a useable solid electrolyte has not been discovered heretofore.

It has recently been reported that $Li_7La_3Zr_2O_{12}$ (hereinafter LLZ), a garnet-type ceramic material, has excellent lithium resistance and can be utilized as a solid electrolyte in an all-solid-state lithium secondary battery (Non Patent Literature 1).

Non Patent Literature 1

Ramaswamy Murugan et al., Agnew. Chem. Int., Ed. 2007, 46, 1 to 5.

SUMMARY OF THE INVENTION

However, when the inventors have attempted to fabricate LLZ pellets based on the above document, LLZ pellets usable as a solid electrolyte for an all-solid-state lithium secondary battery could not be obtained thereby, and such pellets could not be considered a material that can be practically applied as a solid electrolyte for an all-solid-state lithium secondary battery.

Thus, an object of the present teachings is to provide a ceramic material that can exhibit the compactness and conductivity sufficient for use as a solid electrolyte material in a lithium secondary battery, and a process for producing the same. According to the present teachings, a practical all-solid-state lithium secondary battery comprising such a ceramic material as the solid electrolyte thereof may also be provided.

The inventors have carried out various investigations on the raw materials and procedures including heat treatment conditions for manufacturing LLZ ceramics, and on the ceramics themselves that were ultimately obtained, it was learned that, stable, sintered pellets can be obtained when aluminum is contained therein in addition to the aforementioned LLZ components, and these pellets exhibit excellent lithium conductivity. Therefore, the present description provides teachings as described below.

The present teachings provide a ceramic material containing aluminum (Al), and having a garnet-type or garnet-like crystal structure containing lithium (Li), lanthanum (La), zirconium (Zr), and oxygen (O).

The aforementioned ceramic material can have either the garnet-type or garnet-like crystal structure. Preferably, it may be a sintered compact. Additionally, with respect to the total weight thereof, it may contain the aforementioned aluminum at within 0.1 wt % and 2 wt %. Moreover, the aforementioned ceramic material may be obtained by heat treating a lithium component, lanthanum component, and zirconium component in a molar ratio suitable for obtaining one of the aforementioned garnet-type crystal structure and the garnet-like crystal structure in the presence of the aluminum component. Finally, the ceramic material of the present teachings may be used as a solid electrolyte material for a lithium secondary battery.

The present teachings may provide a process for producing a ceramic material comprising:

a first firing step of firing a starting material containing a lithium (Li) component, lanthanum (La) component, and zirconium (Zr) component to obtain a primary firing powder for ceramic synthesis containing lithium (Li), lanthanum (La), zirconium (Zr), and oxygen (O); and a second firing step of firing the aforementioned primary firing powder obtained in the first firing step to synthesize a ceramic having a garnet-type crystal structure or a garnet-like crystal structure containing lithium (Li), lanthanum (La), zirconium (Zr), and oxygen (O), wherein a ceramic material having one of the above crystal structures and containing aluminum (Al) is produced by performing either or both of the aforementioned first firing step and second firing step in the presence of a compound containing aluminum (an aluminum-containing compound).

In the production process of the present teachings, the aforementioned second firing step may include sintering by firing a formed compact of the aforementioned primary firing powder. Furthermore, the aforementioned compound containing aluminum may be one or more types selected from a group consisting of $Al_2O_3$, Al $(NO_3)_3 \cdot 9H_2O$, $Al(OH)_3$, Al, aluminum acetylacetonate, aluminum triethoxide, aluminum butoxide, aluminum propoxide, aluminum methoxide, aluminum chloride, aluminum chloride hexahydrate, diethylaluminum chloride, aluminum oleate, aluminum acetate n-hydrate, aluminum oxalate, aluminum bromide hexahydrate, aluminum stearate, triethyl aluminum, trimethyl aluminum, triisobutyl aluminum, aluminum sulfate, and aluminum iodide. Additionally, the aforementioned second firing step may comprise firing at a temperature between 950° C. and 1250° C.

The present teachings may provide an all-solid-state secondary battery comprising a cathode, an anode, and a solid electrolyte containing aluminum (Al) and having a garnet-type crystal structure or garnet-like crystal structure containing lithium (Li), lanthanum (La), zirconium (Zr), and oxygen (O).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
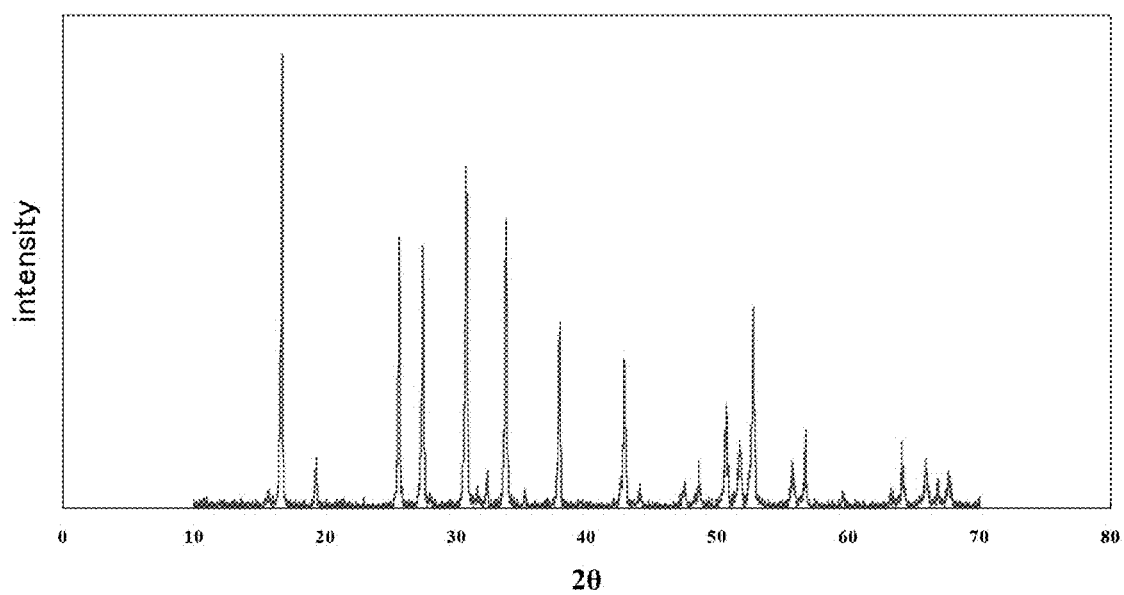
FIG. 1 is an x-ray diffraction spectrum of sample 1.
Figure 2:
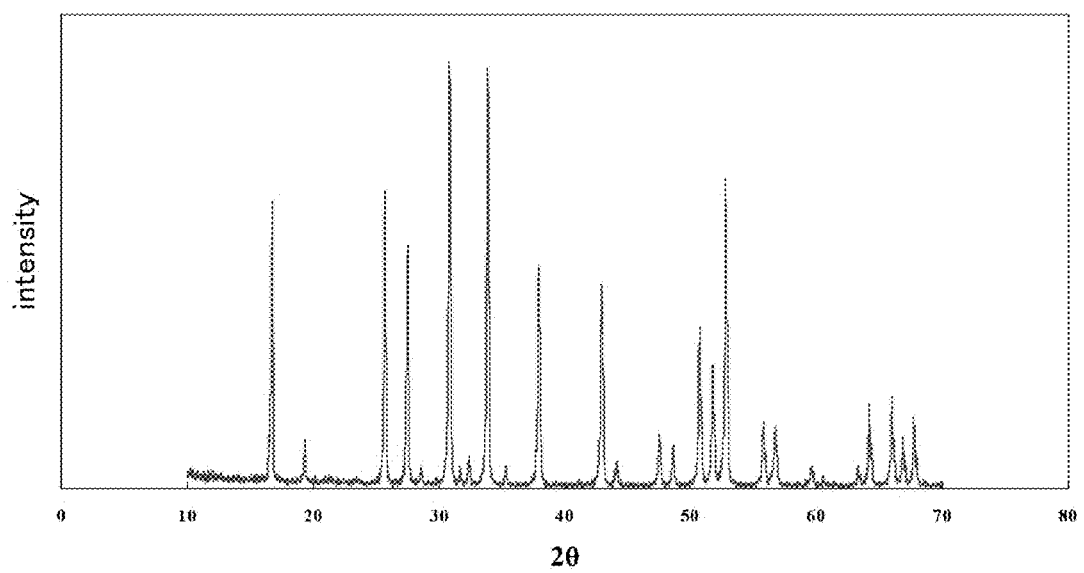
FIG. 2 is an x-ray diffraction spectrum of sample 2.
Figure 3:
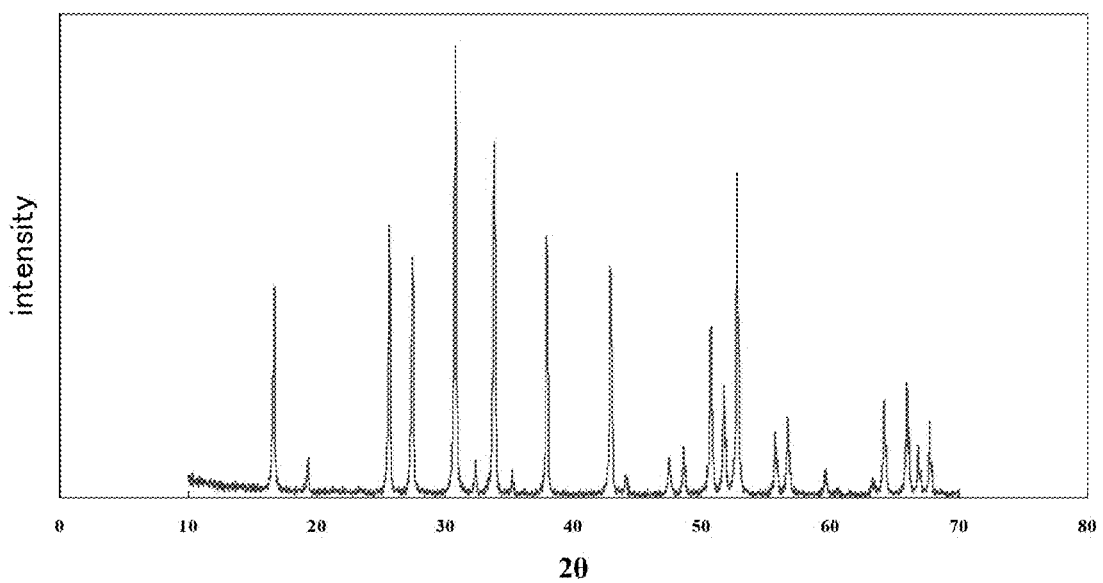
FIG. 3 is an x-ray diffraction spectrum of sample 3.
Figure 4:
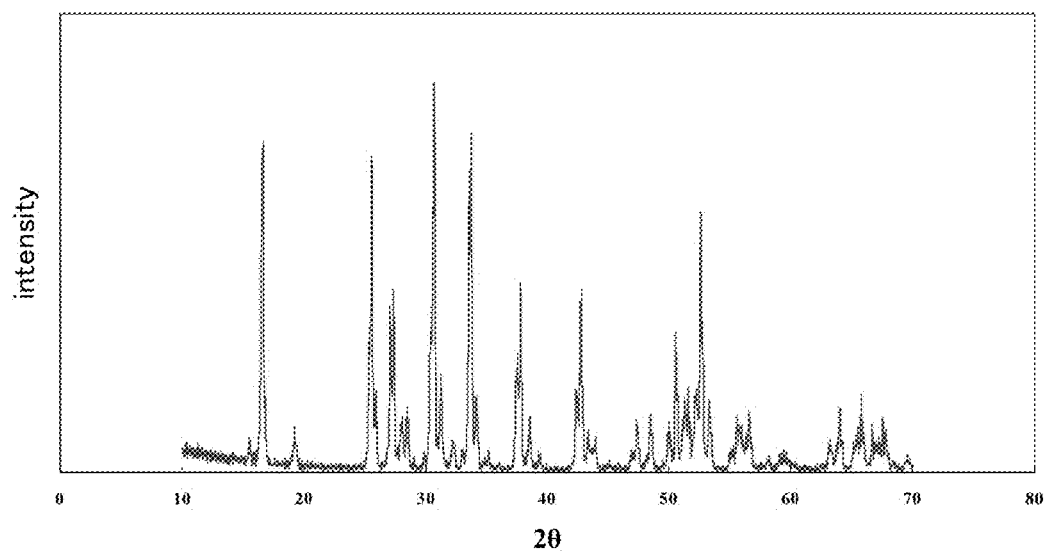
FIG. 4 is an x-ray diffraction spectrum of a comparative example.

The present teachings relate to a ceramic material and process for producing the same, and to an all-solid-state lithium secondary battery. Through the inclusion of aluminum therein, the ceramic material of the present teachings enable a sintered compact with an increased degree of sintering (density) and conductivity. Thus, it is possible to obtain a ceramic material with excellent lithium resistance that can also be used as a solid electrolyte applicable to an all-solid-state lithium secondary battery. Additionally, this ceramic material can be stably produced in accordance with the production process of the present teachings. Furthermore, the present teachings provide an all-solid-state lithium secondary battery with excellent lithium resistance.

First the ceramic material and process for producing the same of the present teachings are described below. Then the all-solid-state lithium secondary battery utilizing that ceramic material as a solid electrolyte material is described.
Ceramic Material The ceramic of the present teachings has one of a garnet-type crystal structure and a garnet-like crystal structure. The respective crystal structure includes lithium, lanthanum, zirconium, and oxygen (which hereinafter referred to as an LLZ crystal structure). The LLZ crystal structure can essentially consist of Li, La, Zr, and O. In the chemical composition of the ceramic material of the present teachings, the La and Zr contents are adjusted to match that of the $Li_7La_3Zr_2O_{12}$ (LLZ) disclosed in Non Patent Literature 1: Ramaswamy Murugan et al., Agnew. Chem. Int., Ed. 2007, 46, 1 to 5, and in consideration of the vaporization of Li during the heat treatment, the Li content is increased by 10%. In actual practice, however, because loss occurs during grinding and recovery of the synthesized powder, etc., it is understood that the content of the elements Li, La, Zr, and O will vary somewhat from the composition of the chemical formula disclosed in the aforesaid Non Patent Literature 1.

It can be noted that one characteristic of the LLZ crystal structure of the ceramic material of the present teachings is that it has an XRD diffraction pattern similar to that of ICDD (International Centre for Diffraction Data) powder diffraction file 045-0109 ($Li_5La_3Nb_2O_2$) listed below as an example of a material having the same garnet-type crystal pattern. In comparison to 045-0109, however, because the structural elements are different, and it is possible that the Li concentration, etc., in the ceramic are different, and the angles of diffraction and the diffraction intensity ratios may also differ.

The ceramic material of the present teaching contains aluminum. The inventors have learned that by including aluminum therein it is possible for the first time to obtain a ceramic having an LLZ crystal structure as sintered pellets that can be handled, and having increased conductivity. The aluminum content preferably lies within a range wherein the degree of sintering (density of the sintered compact) and/or lithium conductivity are improved thereby. The density is calculated, for example, by measuring the weight and volume of the pellets. In the case of cylindrical pellets, for example, the density is preferably determined by a method in which after the pellet has been weighed, the diameter is measured at several locations with a micrometer and the average value thereof is taken, the thickness of the cylindrical pellet is also measured in the same manner with a micrometer and the volume is calculated therefrom, and then the density is calculated from the weight and volume, or by another method providing the same level of precision and accuracy. Lithium conductivity, for example, is preferably measured by the AC impedance method, or another method providing the same level of precision and accuracy.

With respect to the aluminum content enabling such improvements in the properties of the ceramic material, the aluminum content for an intended application can be determined by using the stoichiometric quantity of LLZ and performing a firing step in the presence of a suitable amount of aluminum component in relation to the mixture of a suitable molar ratio of lithium component, lanthanum component, and zirconium component based on that stoichiometric quantity to obtain a sintered compact, and then measuring the properties thereof. As one example, it has been found by the inventors that improved density and improved lithium conductivity are realized when 0.1 wt % or more of aluminum is contained in relation to the total weight of the LLZ ceramic powder and the sintered pellets ultimately obtained therefrom. It has also been found by the inventors that when the content greatly exceeds 2 wt %, lithium conductivity tends to fall off. Hence, preferably, the aluminum content is 1.5 wt % or less. More preferably, the aluminum content is between 0.31 wt % and 1.38 wt %, and still more preferably, between 0.45 wt % and 1.32 wt % in relation to the total weight. Additionally, the upper limit of aluminum content is preferably 0.80 wt % or less, more preferably 0.75 wt % or less, still more preferably 0.73 wt %, and even more preferably 0.72 wt % or less. Furthermore, the lower limit of aluminum content is preferably 0.50 wt % or more, more preferably 0.60 wt % or more, still more preferably 0.65 wt % or more, and even more preferably 0.68 wt % or more.

The aluminum in the ceramic material of the present teachings can be detected and the content thereof can be measured by ICP (inductively coupled plasma) emission spectrometry.

The ceramic material of the present teachings can be either a ceramic powder or a sintered compact, provided it has a LLZ crystal structure and contains aluminum. The sintered compact is preferred as the solid electrolyte of the all-solid-state lithium secondary battery. In addition, the powder is preferred as the material for obtaining such a solid electrolyte. The form of the aluminum present in the ceramic material of the present teachings is not particularly limited herein, provided a monophasic LLZ crystal can be observed and the fact that it contains aluminum can be verified by the ICP emission spectrometry.

The ceramic material of the present teachings containing aluminum and having an increased degree of sintering (density) and/or lithium conductivity in the sintered compact thereof is preferably a solid electrolyte material to be used in the all-solid-state lithium secondary battery. Furthermore, it can also be preferably used for an oxygen sensor material that utilizes conductivity.

Process for Producing the Ceramic Material

The process for producing the ceramic material of the present embodiment comprises: a first firing step of firing a starting material containing a lithium (Li) component, lanthanum (La) component, zirconium (Zr) component to obtain a primary firing powder for ceramic synthesis containing lithium (Li), lanthanum (La), zirconium (Zr), and oxygen (O); and a second firing step of firing the aforementioned primary firing powder obtained in the aforementioned first firing step to synthesize a ceramic having one of the garnet-type or the garnet-like crystal structure including lithium (Li), lanthanum (La), zirconium (Zr), and oxygen (O). In the production process, a ceramic material having one of the above crystal structures and containing aluminum can be produced by performing either or both of the aforementioned first firing step and second firing step in the presence of the compound containing aluminum (Al). In one embodiment of the present teachings, the starting material may further include oxygen (O) component. Specifically, at least one of the containing material for one of lithium (Li) component, lanthanum (La) component and zirconium (Zr) component may include oxygen (O) component. In an alternative embodiment, the starting material may not include oxygen (O) component. In either cases, through the first firing step, the starting material is fired in the appropriate way (e.g., selecting an appropriate firing atmosphere) so that a primary firing powder for ceramic synthesis containing lithium (Li), lanthanum (La), zirconium (Zr), and oxygen (O) can be obtained.

The process for producing the ceramic material of the present teachings enables the sintered compact or the ceramic powder for fabricating the sintered compact to be easily obtained, and the sintered compact has an LLZ crystal structure, contains aluminum, and features a degree of sintering (density) enabling handling thereof and good conductivity.

Preparation of Starting Materials

The lithium component, lanthanum component, zirconium component and oxygen component, as well as the compound containing aluminum can be noted as starting materials for the ceramic material of the present teachings.

Lithium Component, Lanthanum Component, and Zirconium Component

These various components are not particularly limited herein, and the various metal salts that contain each of these metal components: such as metal oxides, metal hydroxides, metal carbonates, and the like, can be suitably selected and used. For example, $Li_2CO_3$ or $LiOH$ can be used as the lithium component, $La(OH)_3$ or $La_2O_3$ can be used as the lanthanum component, and $ZrO_2$ can be used as zirconium component. The oxygen component normally is included in a compound containing a constituent metal element.

The starting material for obtaining the ceramic material of the present teachings can contain a lithium component, lanthanum component and zirconium component such that an LLZ crystal structure can obtain the lithium component, lanthanum component, zirconium component, and oxygen component by a solid phase reaction, etc. In accordance with the stoichiometric composition of LLZ, the lithium component, lanthanum component and zirconium component can be used in a composition at a 7:3:2 ratio or one approximating the same. If the loss of the lithium component is taken into consideration, the lithium component can be contained in an amount approximately 10% greater than the molar ratio equivalent based on the stoichiometry for lithium in the LLZ crystal, and the lanthanum and zirconium components can be contained in amounts corresponding to the LLZ molar ratio for each. As examples of molar ratios when specific compounds are used, in the case of $Li_2CO_3$:$La(OH)_3$:$ZrO_2$, the molar ratio is approximately 3.85:3:2; in the case of $Li_2CO_3$:$La_2O_3$:$ZrO_2$, approximately 3.85:1.5:2; in the case of $LiOH$:$La(OH)_3$:$ZrO_2$, approximately 7.7:3:2, and in the case of $LiOH$:$La_2O_3$:$ZrO_2$, approximately 7.7:1.5:2.

Aluminum-Containing Compound

The aluminum-containing compound is not particularly limited herein and the various metal salts containing aluminum such as metal oxides, metal hydroxides, metal nitrates, metal organic compounds, elemental metal, and the like can be suitably selected and used. For example, $Al_2O_3$, $Al(NO_3)_3 \cdot 9H_2O$, $Al(OH)_3$, Al, aluminum acetylacetonate, aluminum triethoxide, aluminum butoxide, aluminum propoxide, aluminum methoxide, aluminum chloride, aluminum chloride hexahydrate, diethylaluminum chloride, aluminum oleate, aluminum acetate n-hydrate, aluminum oxalate, aluminum bromide hexahydrate, aluminum stearate, triethyl aluminum, trimethyl aluminum, triisobutyl aluminum, aluminum sulfate, and aluminum iodide can be used. The compound containing aluminum is present in relation to the lithium component, lanthanum component and zirconium component at a range in which the LLZ crystal structure can be maintained and an improvement in the degree of sintering and conductivity is obtained through the inclusion of aluminum. As previously described, the amount for the compound containing aluminum can be obtained, for example, by carrying out a firing step in the presence of various amounts of the compound containing aluminum in relation to the LLZ structural components, obtaining a sintered compact, and measuring the density, etc., thereof. Furthermore, the amount of the aluminum-containing compound can be obtained, for example, by carrying out a firing step in the presence of various amounts of the compound containing aluminum in relation to the LLZ structural components, obtaining a sintered compact, and measuring the conductivity thereof. The supply form of the compound containing aluminum is described in detail below.

Each of these starting materials can be used without any particular limitation herein, provided they are produced industrially and can be obtained. The purity is preferably 95% or more, and more preferably 98% or more. The water content thereof is preferably 1% or less, and if necessary, the material can be dried.

For preparing the starting material powder, a publicly known method of preparing a starting material powder for the synthesis of a ceramic powder can be suitably employed. For example, the material can be placed in a mortar machine (automated mortar and pestle), suitable ball mill, etc., and mixed uniformly.

Firing Step

The process for producing the ceramic material of the present embodiment comprises: a first firing step for obtaining a primary firing powder for ceramic synthesis containing lithium (Li), lanthanum (La), zirconium (Zr), and oxygen (O); and a second firing step in which the aforementioned primary firing powder is fired to synthesize a ceramic having an LLZ crystal structure. In addition, a ceramic material having the LLZ crystal structure and containing aluminum can be obtained by performing either or both of these firing steps in the presence of a compound containing aluminum (Al). Below, each step is described and the supply form (i.e., presence) of the compound containing aluminum in each step is also described.

First Firing Step

The first firing step is a step in which at least thermal decomposition of the lithium component, lanthanum component, etc., is carried out to obtain a primary firing powder to facilitate formation of the LLZ crystal structure in the second firing step. Alternatively, the primary firing powder may already have the LLZ crystal structure. The firing temperature is preferably between 850° C. and 1150° C. The first firing step can feature a step of heating at a lower heating temperature and a step of heating at a higher heating temperature both within the aforementioned temperature range. A ceramic powder in a more uniform state can be obtained by providing such heating steps, and a high quality sintered compact can be obtained in the second firing step thereby. When the first firing step is carried out using such multiple firing steps, it is preferable to mix and grind the powder using the mortar machine, ball mill, vibrating mill, and the like after each firing step. It is also desirable to perform drying in a powdering method. By so doing, it is possible to obtain an even more uniform LLZ phase through the second firing step.

The heat treatment steps constituting the first firing step are preferably carried out as a heat treatment step between 850° C. and 950° C. and a heat treatment step between 1075° C. and 1150° C. Even more preferably they are carried out as a heat treatment step between 875° C. and 925° C. (approximately 900° C. is even more preferred) and a heat treatment step between 1100° C. and 1150° C. (approximately 1125° C. is even more preferred).

In the first firing step, preferably, the total heating time at the highest temperature established as the overall heating temperature is roughly 10 hours to 15 hours. When the first firing step constitutes two heat treatment steps, the preferred heating time at each maximum temperature is about 5 to 6 hours.

On the other hand, the first heat treatment step can be shortened by changing one or more components of the starting material. For example, when LiOH is used as one of the component of the starting material, the LLZ structural components containing lithium, lanthanum and zirconium can be heated for 10 hours or less at the maximum temperature in the heat treatment step between 850° C. and 950° C. to obtain the LLZ crystal structure. This is because the LiOH used in the starting material forms a liquid phase at a low temperature and reacts easily with the other components at a lower temperature.

When the first firing step is carried out in the presence of the compound containing aluminum, for example, the starting material powder can contain the compound containing aluminum together with other components such as lanthanum component.

Second Firing Step

The second firing step can be used as a step in which the primary firing powder obtained in the above first firing step is heated at a temperature between 950° C. and 1250° C. In accordance with the second firing step, the primary firing powder obtained in the first firing step is fired, and ceramic having the LLZ crystal structure, which is a complex oxide, can ultimately be obtained.

To obtain the LLZ crystal structure, for example, the LLZ structural components containing lithium, lanthanum, and zirconium are subjected to a heat treatment at a temperature between 1125° C. and 1250° C. When $LiCO_3$ is used as the lithium starting material, it is preferable to perform the heat treatment between 1125° C. and 1250° C. If the temperature is lower than 1125° C., an LLZ monophase is difficult to obtain and the lithium conductivity tends to be low, and if the temperature exceeds 1250° C., formation of heterogeneous phases ($La_2Zr_2O_7$, etc.) occur and the lithium conductivity tends to be low. Moreover, crystal growth becomes pronounced, and maintaining the strength of the solid electrolyte tends to become more difficult. A more preferred temperature is approximately 1180° C. to 1230° C.

On the other hand, the temperature of the second heat treatment step can be reduced by changing one or more components of the starting material. For example, when LiOH is used as the lithium source in the starting material, a heat treatment can be carried out on the LLZ structural components including lithium, lanthanum, and zirconium at a temperature between 950° C. and 1125° C. to obtain the LLZ crystal structure. This is because the LiOH used in the starting material forms a liquid phase at a low temperature and reacts easily with the other components at a lower temperature.

The heating time at the above heating temperature in the second firing step is roughly between 18 h and 50 h. If the time is shorter than 18 h, LLZ ceramic will not be sufficiently formed. If the time is longer than 50 h, not only is a reaction with the setters likely to occur via the embedding powder, but also the crystal growth becomes pronounced and the strength as a sample cannot be maintained. More preferably, the lower limit of the heating time is 30 h.

The second firing step is preferably carried out after forming a compact, in which a desired three-dimensional shape (e.g., a shape and size that can be used as a solid electrolyte in an all-solid-state secondary battery) is imparted by compression molding of the primary firing powder using a well-known pressing method. By making the powder into a compact, not only is the solid phase reaction accelerated, but also a sintered compact can be obtained therefrom. It is also possible for the ceramic powder obtained in the second firing step to be formed into a compact after the second firing step, and a separate sintering step is then carried out at the same temperature as that used in the second firing step.

When a compact made of primary firing powder is fired and sintered in the second firing step, it is preferable to carry out that step by embedding the compact in an identical powder. By so doing, the loss of lithium can be reduced, and changes in the composition before and after the second firing step can also be limited. The compact of starting material powder is normally embedded in starting material powder such that it rests on starting material powder that has been spread and packed therearound. By so doing, it is possible to inhibit reaction thereof with the setter. Furthermore, warping of the sintered compact during firing can be prevented by setters pressing against the compact from above and below the embedding powder as needed.

On the other hand, if LiOH and the like is used as the lithium source in the second heat treatment step, and the temperature is lowered, the compact of primary firing powder can be sintered without being embedded in the same powder. By using a lower temperature in the second heat treatment step, the loss of lithium is relatively decreased, and reaction with the setters can also be reduced.

A mode in which the primary firing powder obtained by carrying out the first firing step in the presence of the aluminum-containing compound is used unchanged in the second firing step, and also a mode in which the second firing step is carried out after the aluminum-containing compound is added to and mixed with the primary firing powder obtained by carrying out the first firing step without the presence of aluminum can both be noted as ways of carrying out the second firing step in the presence of the aluminum-containing compound. Either of these modes can be used for carrying out the second firing step in the presence of the aluminum-containing compound. Alternately, these modes can be suitably combined therefor. In any case, the compound containing aluminum will be present in the second firing step, particularly in the step accompanying sintering. By so doing, both an excellent degree of sintering and conductivity can be obtained.

A ceramic material powder having an LLZ crystal structure and containing aluminum, or a sintered compact thereof can be obtained in accordance with the above firing steps. In the process for producing the ceramic material of the present teachings, the heating temperature is lower than what had conventionally been required to increase the degree of sintering, and therefore the energy cost for obtaining the solid electrolyte for the all-solid-state lithium secondary battery is decreased. Furthermore, the ceramic material of the present teachings can be reliably obtained by carrying out the first firing step and the second firing step.

All-Solid-State Lithium Secondary Battery

The all-solid-state lithium secondary battery of the present teachings can comprise a cathode, an anode, and a solid electrolyte containing aluminum (Al), and having a garnet-type crystal structure or a garnet-like crystal structure, each of which contains lithium (Li), lanthanum (La), zirconium (Zr), and oxygen (O). The all-solid-state lithium secondary battery of the present teachings comprises a solid electrolyte with excellent lithium resistance, and it is a more practical secondary battery than the conventional ones.

Preferably, a sintered compact obtained by the process for producing the ceramic material of the present teachings is utilized, either unchanged or as a suitably worked solid electrolyte without grinding thereof in the secondary battery. It is also possible to utilize a powder fired in a powdered state in the second firing process to obtain a formed compact containing the Li-La-Zr ceramic and other component(s), and to use that formed compact as the solid electrolyte. A publicly known, prior art process for producing a ceramic compact may be applied to the process for producing the formed compact. Examples of forming methods include a pressing method, doctor blade method, roll coater method, and the like.

The cathode and anode of the all-solid-state lithium secondary battery of the present teachings may comprise a publicly known, prior art cathode active substance and anode active substance used in a lithium secondary battery, and may be produced by conventional Cathode Active Materials The cathode active material is not particularly limited herein, and a publicly known, prior art cathode active material utilized in all-solid-state batteries can be used. In particular, if a metal oxide is used as the cathode active material, sintering of the secondary battery can be performed in an oxygen-containing atmosphere. Specific examples of such a cathode active material include the following: manganese oxide (MnO), iron oxides, copper oxides, nickel oxides, lithium-manganese complex oxides (e.g., $Li_xMn_2O_4$ or $Li_xMnO_2$), lithium-nickel complex oxides (e.g., $Li_xNiO_2$), lithium-cobalt complex oxides (e.g. $Li_xCoO_2$), lithium cobalt nickel oxides ($LiNi_{1-y}Co_yO_2$), lithium-manganese-cobalt complex oxides (e.g., $LiMn_yCo_{1-y}O_2$), spinel-phase lithium-manganese-nickel complex oxides (e.g., $Li_xMm_{2-y}Ni_yO_4$), lithium phosphates having an olivine structure (e.g., $Li_xFePO_4$, $Li_xFe_{1-y}Mn_yPO_4$, $Li_xCoPO_4$), lithium phosphates having a NASICON-type structure (e.g., $Li_7V_2(PO_4)_3$), iron (III) sulfate ($Fe_2(SO_4)_3$), and vanadium oxides (e.g., $V_2O_5$). One type thereof can be used alone, or two or more types thereof can be used in combination. Preferably, x and y in these chemical formulas lie within the ranges of $1<x<5$, and $0<y<1$. Among the above, $LiCoO_2$, $Li_xV_2(PO_4)_3$, $LiNiPO_4$, and $LiFePO_4$ are preferred.

Anode Active Materials

The anode active material is not particularly limited herein, and a publicly known, prior art anode active material utilized in all-solid-state batteries can be used. Examples include carbon, metallic lithium (Li), metal compounds, metal oxides, lithium-metal compounds, lithium-metal oxides (including lithium-transition metal complex oxides), boron-doped carbon, graphite, compounds having a NASICON structure, and the like. One type thereof can be used alone, or two or more types thereof can be used in combination. For example, if the aforementioned metallic lithium (Li) is used, the capacity of the all-solid-state battery can be increased. Examples of the aforementioned carbon include publicly known, prior art carbon materials such as graphite carbon, hard carbon, soft carbon, and the like. Examples of the aforementioned metal compounds include LiAl, LiZn, $Li_3Bi$, $Li_3Cd$, $Li_3Sd$, $Li_4Si$, $Li_{4.4}Pb$, $Li_{4.4}Sn$, $Li_{0.17}C(LiC_6)$, and the like. Examples of the aforementioned metal oxides include SnO, $SnO_2$, GeO, $GeO_2$, $In_2O$, $In_2O_3$, PbO, $PbO_2$, $Pb_2O_3$, $Pb_3O_4$, $Ag_2O$, AgO, $Ag_2O_3$, $Sb_2O_3$, $Sb_2O_4$, $Sb_2O_5$, SiO, ZnO, CoO, NiO, $TiO_2$, FeO, and the like. Examples of the aforementioned lithium-metal compounds include $Li_3FeN_2$, $Li_{2.6}Co_{0.4}N$, $Li_{2.6}Cu_{0.4}N$, and the like. Examples of the aforementioned lithium-metal oxides (including lithium-transition metal complex oxides) include the lithium-titanium complex oxide expressed as $Li_4Ti_5O_{12}$. Examples of the aforementioned boron-doped carbon include boron-doped carbon, boron-doped graphite, and the like. Preferably, metallic lithium is used.

To obtain a cathode and anode, a cathode material or anode material comprising the aforementioned active substance as well as a suitable electron conduction aid and binder can be prepared beforehand. Examples of the electron conduction aid include acetylene black, carbon black, graphite, various carbon fibers, carbon nanotubes, and the like. Examples of the binder include polyvinylidene fluoride (PVDF), SBR, polyimide, polytetrafluoroethylene, and the like. For the cathode one type of these active substances can be used, or two or more types thereof can be used in combination.

The cathode and anode comprised by the all-solid-state lithium secondary battery can assume any mode or configuration provided they can function as a secondary battery. The aforementioned cathode active material or cathode material and anode active material or anode material can be formed using a publicly known forming method such as a pressing method, doctor blade method, roll coater method, and the like. With the pressing method, a formed compact can be obtained by packing the cathode active material powder or anode active material powder into a mold, etc., and compressing it. In the doctor blade method or the roll coater method, on the other hand, first the cathode active substance or anode active substance is mixed with a binder such as polyvinyl alcohol to obtain a mixture. A suitable amount of solid electrolyte can also be added to the mixture as needed. Next, an organic solvent such as toluene is added to the resulting mixture to prepare a cathode slurry. Then the prepared cathode slurry is formed into a thin film or sheet of a desired thickness by the doctor blade method or roll coater method. After drying, the cathode and anode can be fabricated by carrying out processing such as further cutting and firing as needed. A formed compact suitably containing powder of the aforementioned various active substances and the ceramic material of the present teachings can be used for the cathode and anode.

The cells of the all-solid-state lithium secondary battery of the present teachings are fabricated by combining the solid electrolyte with a cathode material or cathode and anode material or anode prepared in the above manner. Fabrication of the cells may differ depending on the battery shape to be ultimately obtained. For example, it is possible to form the cathode by adding cathode material to one surface of the solid state electrolyte and to form the anode by adding anode material to the other surface of the solid electrolyte. The cell structure of the all-solid-state secondary battery of the present teachings is not limited herein, and in addition to a coin-shape, various battery shapes such as a cylindrical shape and box shape are also possible.

Based on the above description, the present teaching enables implementation of a manufacturing process for an all-solid-state lithium secondary battery comprising a step of heat-treating the aforementioned staring material to obtain an LLZ sintered compact, and a step of fabricating the cells of the aforementioned all-solid-state lithium secondary battery by using the aforementioned sintered compact as a solid electrolyte, and combining the same with a cathode and an anode.

EXAMPLES

The present teachings are described below through examples. Note that the following examples are merely for the purpose of describing the present teachings, and the present teachings are by no means limited thereto.

Example 1

Synthesis of Li-La-Zr Ceramic Containing Aluminum Preparation of Starting Material As the starting material, lithium carbonate (Honjo Chemical Corporation), lanthanum hydroxide (Shin-Etsu Chemical Co., Ltd.), and zirconium oxide (Tosoh Corporation) were weighed out to obtain a molar ratio of 3.85:3:2. These powders were mixed with a mortar machine to make the starting material powder.

First Firing Step

The aforementioned starting material powder was placed in an alumina crucible, and the temperature was raised at 600° C./h and then maintained at 900° C. for 6 h. After the heat treatment, the part of the powder in contact with the alumina crucible (about half of the powder by weight) was removed, and the powder not in contact with the crucible was collected, pulverized for 30 min in a mortar machine, and placed into an alumina crucible again. The temperature was raised at 600° C./h and then maintained at 1125° C. for 6 h.

Second Firing Step

After the first firing step, the part of the powder in contact with the alumina crucible (about half of the powder by weight) was removed, and the powder not in contact with the crucible was collected. This powder was passed through a sieve, and $Al_2O_3$ was added at concentrations of 0.6 wt %, 1.7 wt %, and 3.0 wt % in relation to the powder and mixed well therewith. The powders were then press-formed using a mold, the pellets were embedded in the same powder, and the temperature was raised at 60° C./h and then maintained at 1180° C. for 36 h to obtain test sample pellets 1 to 3.

Before the second firing step, pellets for the comparative example were obtained in the same manner as above except no $Al_2O_3$ was added.

The upper and lower surfaces of pellets from test samples 1 to 3 and the comparative example were polished, and a structural evaluation, chemical analysis, and electrochemical measurements were performed as described below.

Structural Evaluation

X-ray diffraction was performed on the pellets. The results are shown in FIGS. 1 to 4. After the pellets were weighed, the diameter of each pellet was measured at several locations using a micrometer, and the average value thereof was calculated respectively. Then, the thickness of the cylindrical pellets was measured in the same manner, and the volume was calculated. The density was calculated from the weight and volume. The results are shown in Table 1.

Chemical Analysis

A chemical analysis was carried out to ascertain the aluminum content of the pellets. An ICP analysis for aluminum was performed and the results are shown in Table 1.

Measurement of Lithium Conductivity

Gold sputtering of the resulting pellets was carried out, and after vacuum drying for at least 5 h at 200° C., the pellets without any changes made thereto were placed into a glove box under an argon atmosphere, and therein were incorporated into CR2032 coin cells. The coin cells were taken out into the atmosphere, and the respective AC impedance was measured at a frequency of 1 MHz to 0.1 Hz and a voltage of 10 mV using an electrochemical measurement system (potentiostat/galvanostat/frequency response analyzer) manufactured by Solartron Analytical.

TABLE 1

| Pellet Type | Crystal Structure | Density (g/cm$^3$) | Al Content (wt %) | Li Conductivity (S/cm) |
|---|---|---|---|---|
| Sample 1 | LLZ monophase | 4.04 | 0.45 | $9.2 \times 10^{-6}$ |
| Sample 2 | LLZ monophase | 3.93 | 0.73 | $2.9 \times 10^{-5}$ |
| Sample 3 | LLZ monophase | 4.28 | 1.32 | $3.3 \times 10^{-6}$ |
| Comp. Ex. | LLZ + α | 3.52 | 0 | * |

* Too small to measure

As shown in FIGS. 1 to 4, an LLZ peak was observed in each of the pellets from test samples 1 to 3 and the comparative example based on the fact that a diffraction pattern similar to that of ICDD powder diffraction file 045-0109 was obtained in each case. Test samples 1 to 3 had a monophasic peak, but in the comparative example, the peak was separated. The density in the pellets of test samples 1 to 3 was stable at about 4, but in the comparative example the density was a conspicuously low 3.52, and it was in a vulnerable state of being relatively easily broken.

As shown in Table 1, no aluminum was found in the comparative example pellet, but in the pellets of test samples 1 to 3, aluminum was detected at respective contents of 0.45 wt %, 0.73 wt % and 1.32 wt % in relation to the total weight.

As shown in Table 1, although the lithium conductivity in the comparative example pellet was too small to be measured, in the pellets of test samples 1 to 3, the lithium conductivity ranged from $3.3 \times 10^{-6}$ S/cm to $2.9 \times 10^{-5}$ S/cm, and in particular, it was an excellent $2.9 \times 10^{-5}$ S/cm in test sample 2.

From the above, it was found that an LLZ ceramic with an increased degree of sintering and lithium conductivity is obtained by synthesizing a ceramic having an LLZ crystal structure in the presence of a compound containing aluminum.

Example 2

Synthesis of Li-La-Zr Ceramic Containing Aluminum Preparation of Starting Material Lithium hydroxide monohydrate, lanthanum hydroxide (Shin-Etsu Chemical Co., Ltd.), and zirconium oxide (Tosoh Corporation) were used as the components of the starting material. These powders were weighed out to obtain a LiOH:La(OH)$_3$:ZrO$_2$ molar ratio of 7:3:2. The powders were mixed in a mortar machine to prepare the starting material powder.

Lithium hydroxide monohydrate, lanthanum hydroxide (Shin-Etsu Chemical Co., Ltd.), and zirconium oxide (Tosoh Corporation) were used as the starting materials.

First Heat Treatment Step

The aforementioned starting material powder was placed in an alumina crucible, and the temperature was raised at 600° C./h and then maintained at 900° C. for 6 h.

Second Heat Treatment Step

After the heat treatment, the powder was mixed with ball like media and ground for 3 h using a vibrating mill. After grinding the powder was passed through a sieve and γ-Al$_2$O$_3$ was added at concentrations of 0.6 wt %, 1.5 wt %, 3.0 wt %, and 6.0 wt % in relation to the powder and mixed well therewith. The powders were then press-formed using a mold, the pellets were placed on an alumina setter, each setter was placed in an alumina sheath, and the temperature was raised at 200° C./h and then maintained at 1000° C. for 36 h to obtain test sample pellets 5 to 8. Before the second firing pellets for the comparative example (test sample 4) were obtained in the same manner as above except no γ-Al$_2$O$_3$ was added.

The upper and lower surfaces of pellets from test samples 4 to 8 were polished, and a structural evaluation, chemical analysis, and electrochemical measurements were performed as described below.

Structural Evaluation

X-ray diffraction was performed on the pellets. After the pellets were weighed, the diameter of each pellet was measured at several locations using a micrometer, and the average value thereof was calculated respectively. Then, the thickness of the cylindrical pellets was measured in the same manner, and the volume was calculated. The density was calculated from the weight and volume. The results are shown in Table 2.

Chemical Analysis

A chemical analysis was carried out to ascertain the aluminum content of the pellets. Inductively coupled plasma spectrometry (ICP analysis) for aluminum was performed and the results are shown in Table 2.

Measurement of Lithium Conductivity

Gold sputtering was carried out on the pellets of test samples 4 to 8, and after vacuum drying for at least 5 h at 110° C. or higher, the pellets without any changes made thereto were placed into a glove box under an argon atmosphere, and incorporated into CR2032 coin cells. The coin cells were taken out into the atmosphere, and the respective AC impedance was measured at a frequency of 1 MHz to 0.1 Hz and a voltage of 10 mV using an electrochemical measurement system (potentiostat/galvanostat/frequency response analyzer) manufactured by Solartron Analytical.

TABLE 2

| Pellet Type | Crystal Structure | Density (g/cm$^3$) | Al Content (wt %) | Li Conductivity (S/cm) |
|---|---|---|---|---|
| Sample 4 | LLZ + α | 3.15 | 0 | * |
| Sample 5 | LLZ | 4.48 | 0.31 | $8.3 \times 10^{-6}$ |
| Sample 6 | LLZ | 4.61 | 0.73 | $2.9 \times 10^{-5}$ |
| Sample 7 | LLZ | 4.12 | 1.38 | $1.3 \times 10^{-7}$ |
| Sample 8 | LLZ + α | 2.96 | 2.55 | * |

* Too small to measure

It was found that test samples 4 to 8 had the characteristics of an LLZ crystal structure because a diffraction pattern similar to that of ICDD powder diffraction file 045-0109 was obtained in each case. In test samples 4 and 8 an unknown peak that could not be identified was detected in part of the LLZ crystal structure. The density in the pellets of test samples 5 to 7 was stable at 4 g/cm$^3$ or higher, and very strong pellets were obtained thereby, but in the pellets of test samples 4 and 8 the density was conspicuously low at about 3 g/cm$^3$, and they were in a vulnerable state of being relatively easily broken.

As shown in Table 2, in the pellets of test samples 4 to 8 aluminum was detected at respective contents of 0 wt %, 0.31 wt %, 0.73 wt %, 1.38 wt % and 2.55 wt % in relation to the total weight.

As shown in Table 2, the lithium conductivity in test samples 4 and 8 with aluminum contents of 0 wt % and 2.55 wt %, respectively, was too small to be measured, but in the pellets of test samples 5 to 7, the lithium conductivity ranged from $1.3 \times 10^{-7}$ S/cm to $2.9 \times 10^{-5}$ S/cm, and in particular, it was an excellent $2.9 \times 10^{-5}$ S/cm in test sample 6 with an aluminum content of 0.73 wt %.

Figure 5:
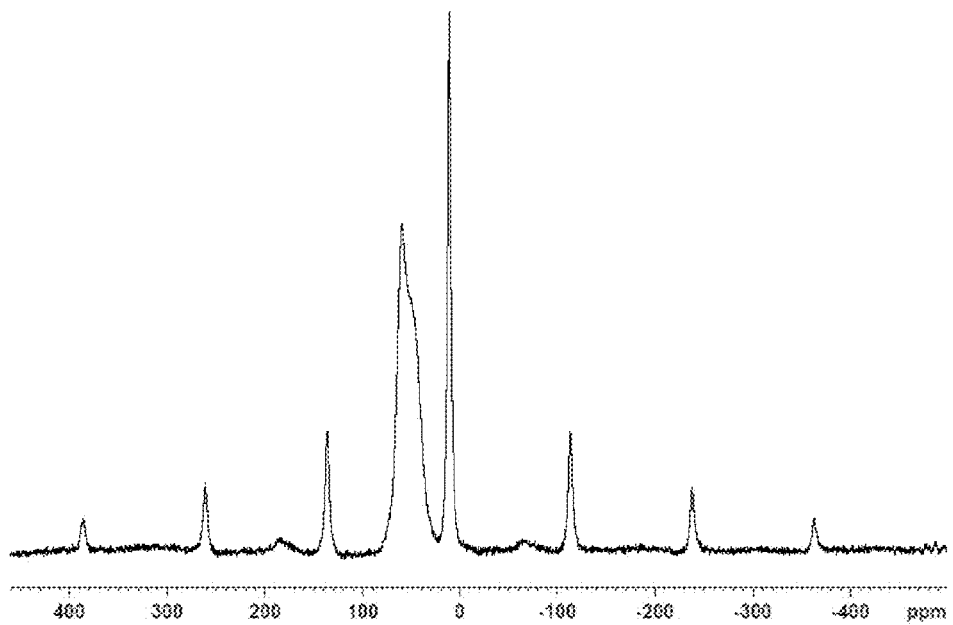
FIG. 5 shows the results of the Al·NMR spectral analysis of sample 6.

Solid-state $^{27}$Al NMR was carried out on test sample 6. The measurement conditions are shown below, and the spectrum shown in FIG. 5 was obtained.

Measurement Conditions
Atmosphere: Dry nitrogen
Method: MAS
Spinning rate: 13 kHz
Nuclear frequency: 104.261310 MHz
Spectral width: 100 kHz
Reference: Saturated aqueous aluminum sulfate
Temperature: Approx. 22° C.

Example 3

Preparation of Starting Material

Lithium hydroxide, lanthanum hydroxide (Shin-Etsu Chemical Co., Ltd.), and zirconium oxide (Tosoh Corporation) were used as the components of the starting material. These powders were weighed out to obtain a LiOH:La(OH)$_3$:ZrO$_2$ molar ratio of 7:3:2. The powders were mixed in a mortar machine to prepare the starting material powder.

First Heat Treatment Step

The aforementioned starting material powder was placed in an alumina crucible, and the temperature was raised at 600° C./h and then maintained at 900° C. for 6 h.

Second Heat Treatment Step

After the heat treatment, γ-Al$_2$O$_3$ was added at a concentration of 1.5 wt % relation to the powder, that powder was mixed with ball like media and ground for 3 h using a vibrating mill. After grinding the powder was passed through a sieve and then press-formed at 300 MPa using a mold. The pellets were placed on an alumina setter, each setter was placed in an alumina sheath, and the temperature was raised at 200° C./h and then maintained at 1000° C. for 36 h to obtain test sample pellets 9.

The upper and lower surfaces of the pellets from test sample 9 were polished, and a structural evaluation, chemical analysis, and electrochemical measurements were performed as described below.

Structural Evaluation

X-ray diffraction was performed on the pellets. After the pellets were weighed, the diameter of each pellet was measured at several locations using a micrometer, and the average value thereof was calculated respectively. Then, the thickness of the cylindrical pellets was measured in the same manner, and the volume was calculated. The density was calculated from the weight and volume. The results show that very strong pellets with a density of 4.61 g/cm$^3$ was obtained.

Chemical Analysis

A chemical analysis was carried out to ascertain the aluminum content of the pellets. Inductively coupled plasma spectrometry (ICP analysis) for aluminum was performed, and the results show that the aluminum content was 0.70 wt %.

Lithium Conductance Measurement

Gold sputtering was carried out on the pellets of test sample 9, and after vacuum drying for at least 5 h at 110° C. or higher, the pellets without any changes made thereto were placed into a glove box under an argon atmosphere and incorporated into CR2032 coin cells. The coin cells were taken out into the atmosphere, and the respective AC impedance was measured at a frequency of 1 MHz to 0.1 Hz and a voltage of 10 mV using an electrochemical measurement system (potentiostat/galvanostat/frequency response analyzer) manufactured by Solartron Analytical. A lithium conductance of $1.6 \times 10^{-4}$ S/cm was obtained.

Figure 6:
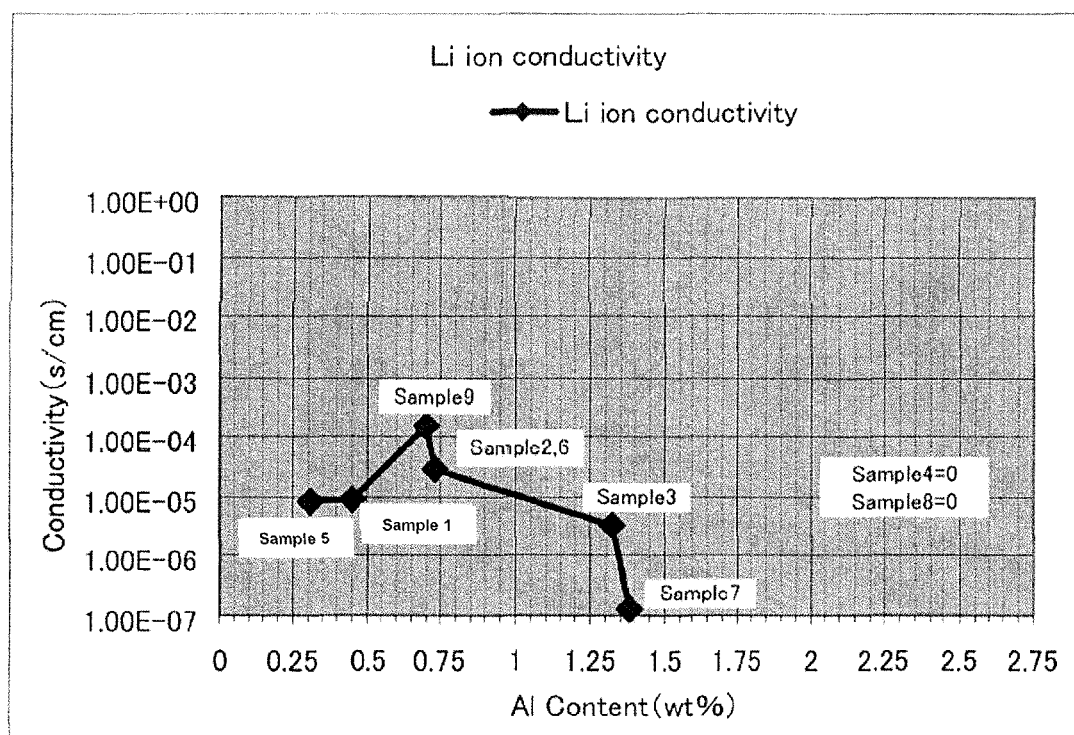
FIG. 6 is a graph showing the relationship between aluminum content and lithium conductivity in samples 1 to 9.

FIG. 6 shows the relationship between aluminum content and lithium conductivity through the results of Examples 1, 2, and 3. As shown in FIG. 6, the aluminum content in the obtained ceramic material was best at 0.70 wt %. It was found that an aluminum content of 0.50 wt % or more is preferred, 0.60 wt % or more is more preferred, 0.65 wt % is still more preferred, and 0.68 wt % or more is even more preferred. Moreover, it was found that an upper limit of 0.80 wt % or less is preferred, 0.75 wt % or less is more preferred, 0.73 wt % is still more preferred, and 0.72 wt % or less is even more preferred.

Figure 7:
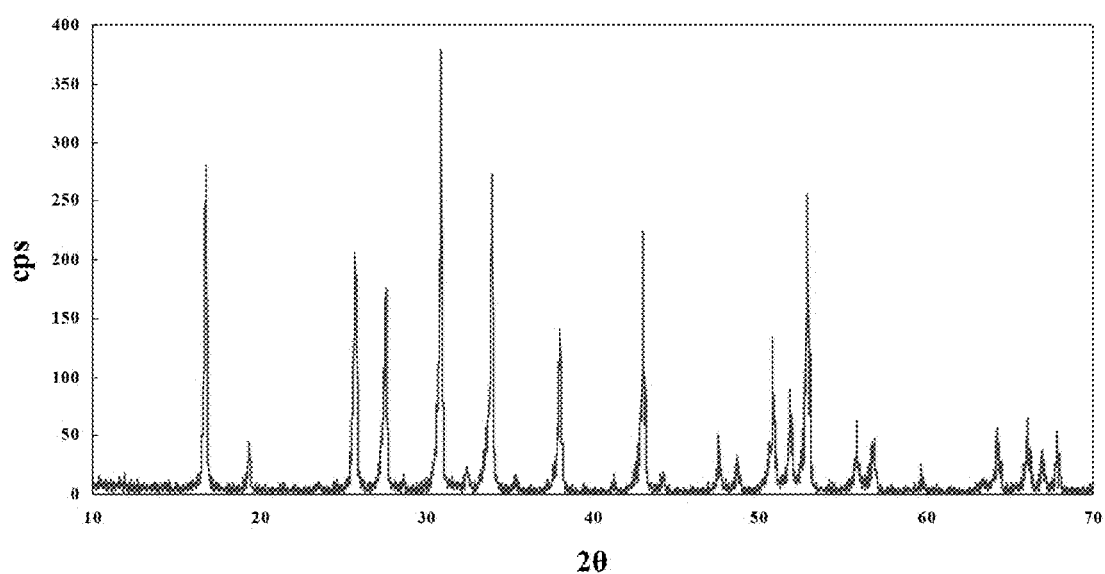
FIG. 7 is an x-ray diffraction spectrum of sample 9.

As shown in FIG. 7, a crystal structure similar to ICDD powder diffraction file 045-0109 was obtained, so it was found that the test sample has the features of an LLZ crystal.

Figure 8:
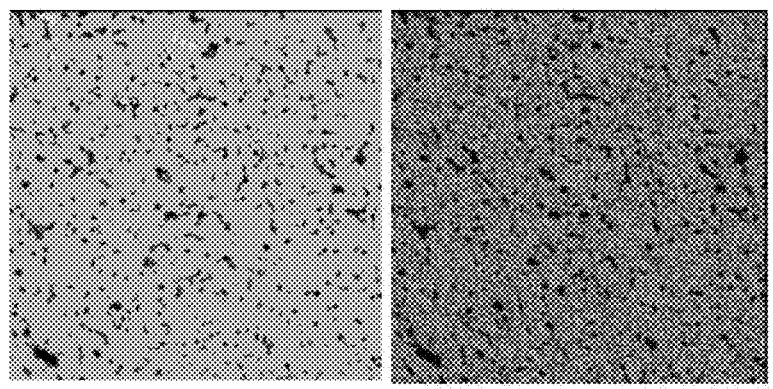
FIG. 8 shows results of measurements of sample 9 with an electron probe microanalyzer (EPMA).
Figure 8:

Furthermore, an elemental analysis of the interior of the pellet was carried out using an electron probe microanalyzer (EPMA). This was carried out under the measurement conditions shown below, and the results shown in FIG. 8 were obtained. The greater the red color at the top of the right hand scale of elemental distribution, the higher the aluminum concentration, and the black at the bottom indicates that aluminum is not present. As shown in FIG. 8, it was found that although a segregation wherein part of the aluminum did not completely react can be seen, essentially the aluminum is uniformly distributed throughout the LLZ crystal everywhere else.

Measurement Conditions

Measurement apparatus: JXA-8500F by JEOL ltd.

Applied voltage: 15 kV

Beam current: $5 \times 10^{-8}$ A

The invention claimed is:

1. A sintered ceramic material having a formula of Li$_a$La$_b$Zr$_x$O$_c$—Al, wherein a:b:x is approximately 7:3:2 and c is approximately 12, the sintered ceramic material comprising:
    a garnet-type LLZ or garnet-like LLZ crystal structure including lithium (Li), lanthanum (La), zirconium (Zr), and oxygen (O), and
    aluminum (Al) as a sintering aid of the sintered ceramic material in an amount of 0.1 wt % -2 wt % with respect to a total weight of the sintered ceramic material.

2. The sintered ceramic material according to claim 1, which is a sintered compact.

3. The sintered ceramic material according to claim 1, having lithium ion conductivity.

4. The sintered ceramic material according to claim 1, which is a solid electrolyte material for a lithium secondary battery.

5. A process for producing a sintered ceramic material having a formula of Li$_a$La$_b$Zr$_x$O$_c$—Al, wherein a:b:x is approximately 7:3:2 and c is approximately 12, the method comprising:
    a first firing step of firing a starting material containing a lithium (Li) component, lanthanum (La) component, and zirconium (Zr) component to obtain a primary firing powder for ceramic synthesis containing lithium (Li), lanthanum (La), zirconium (Zr), and oxygen (O); and
    a second firing step of firing the primary firing powder obtained in the first firing step to synthesize a ceramic having a garnet-type LLZ crystal structure or a garnet-like LLZ crystal structure containing lithium (Li), lanthanum (La), zirconium (Zr), and oxygen (O),
    wherein a sintered ceramic material containing lithium (Li), lanthanum (La), zirconium (Zr) and oxygen (O), and aluminum (Al) as a sintering aid in an amount of 0.1 wt % -2 wt % with respect to a total weight of the sintered ceramic material, and having a garnet-type LLZ crystal structure or a garnet-like LLZ crystal structure is produced by performing either or both of the first firing step and second firing step in the presence of a compound containing aluminum (Al), lithium (Li), lanthanum (La), zirconium (Zr), and oxygen (O).

6. The production process according to claim 5, wherein the second firing step includes firing and sintering of a formed compact of the primary firing powder.

7. The production process according to claim 5, wherein the compound containing aluminum is one or more types selected from a group consisting of Al$_2$O$_3$, Al(NO$_3$)$_3$·9H$_2$O, Al(OH)$_3$, Al, aluminum acetylacetonate, aluminum triethoxide, aluminum butoxide, aluminum propoxide, aluminum methoxide, aluminum chloride, aluminum chloride hexahydrate, diethylaluminum chloride, aluminum oleate, aluminum acetate n-hydrate, aluminum oxalate, aluminum bromide hexahydrate, aluminum stearate, triethyl aluminum, trimethyl aluminum, triisobutyl aluminum, aluminum sulfate, and aluminum iodide.

8. The production process according to claim 5, wherein the first firing step includes preparing the starting material, wherein the starting material further contains an oxygen (O) component.

9. An all-solid-state lithium secondary battery comprising:
a cathode;
an anode; and
a solid electrolyte that is a sintered ceramic compact having a formula of $Li_aLa_bZr_xO_c$—Al, wherein a:b:x is approximately 7:3:2 and c is approximately 12, the sintered ceramic compact comprising a garnet-type LLZ or garnet-like LLZ crystal structure including lithium (Li), lanthanum (La), zirconium (Zr) and oxygen (O), and aluminum (Al) as a sintering aid of the sintered ceramic compact in an amount of 0.1 wt % -2 wt % with respect to a total weight of the sintered ceramic compact.

\* \* \* \* \*